DIRECT CURRENT RESTORATION CIRCUIT

Filed July 1, 1963

INVENTOR
GORDON B. THOMPSON
BY Smart & Biggar
ATTORNEYS.

3,288,926
DIRECT CURRENT RESTORATION CIRCUIT

Gordon B. Thompson, Belleville, Ontario, Canada, assignor to Northern Electric Company Limited, Montreal, Quebec, Canada Filed July 1, 1963, Ser. No. 291,836
8 Claims. (Cl. 178—7.3)

Figure 1:
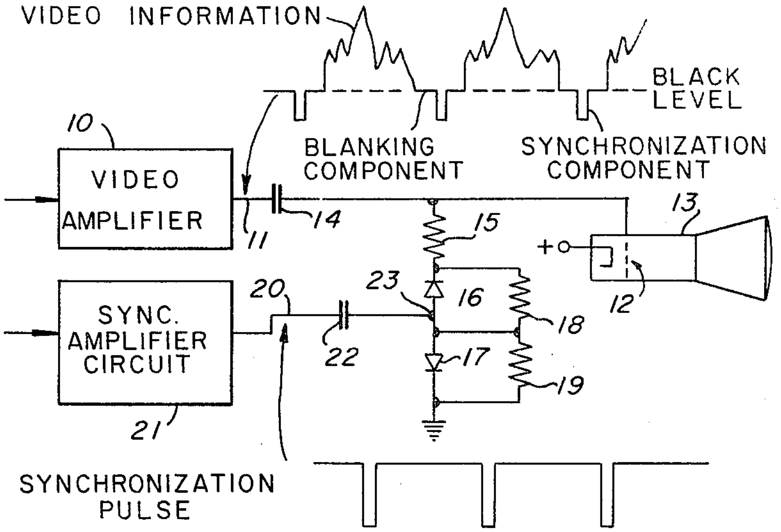

This invention relates to a direct current restoration circuit and more particularly to a keyed D.-C. restoration circuit which may be used for clamping the blanking component of a video signal to a desired potential in a video reproducing device such as a television monitor for a television receiver.

In the past, D.-C. restorer circuits have been used for reinserting the D.-C. component in a video signal before it is supplied to the picture tube of a television receiver or monitor. If the video signal is clamped to the synchronization component tips, any change in amplitude of this component results in a change in setting of the pedestal level. Since the black level of the video signal is generally at or near the pedestal level of the blanking component, this affects the setting of the black and white levels of the picture appearing on the viewing screen. For example, when composite and non-composite video signals are alternately fed to a television monitor, the change from one form of signal to the other results in approximately a 25 percent shift in both the black and white levels appearing on the viewing screen.

The simplest form of D.-C. restoration circuit clamps the blackest portion of the video signal to a fixed potential. In a composite video signal, this would be the tips of the synchronization component, and in a non-composite video signal, it would be the pedestal level of the blanking component. This form of restoration circuit is therefore, not satisfactory for use in a television monitor where both composite and non-composite video signals are being received. The performance of a television receiver of monitor receiving only a composite video signal also varies when the simple D.-C. restoration circuit is used. Any variation in the amplitude of the synchronization component results in a shift of the black-and-white levels of the video signal on the viewing screen.

In order to overcome the above difficulties, complicated circuits have been developed for clamping the video signal to the back porch component of the blanking component. These circuits generally comprise a means for obtaining a delayed synchronization pulse which is obtained from the synchronization amplifier circuit of the television receiver or monitor. The delayed synchronization pulse gates the D.-C. restoration circuit for a brief period following the synchronization component, during which interval, the blanking component is clamped to the desired potential. One difficulty which may occur if the synchronization pulse is always delayed by a fixed amount with respect to the leading edge of the synchronization component, is that during the vertical retrace interval when the synchronization pulses are longer, the video signal will be clamped to the tips of the vertical synchronization component. This results in retrace lines appearing on the screen of the picture tube. Further circuitry has been developed for overcoming this difficulty at considerable expense.

The present invention comprises a conventional D.-C. restoration circuit in which additional circuitry has been added to key out the restoration action during the presence of either the horizontal or the vertical synchronization pulses. The video signal is therefore, effectively clamped only to the pedestal level of the blanking component. Since the length of the keying pulse is triggered directly by the pulses from the synchronization amplifier circuit, no problem is encountered when the vertical synchronization component is present, and the video signal will always be clamped to the desired level.

Figure 2:
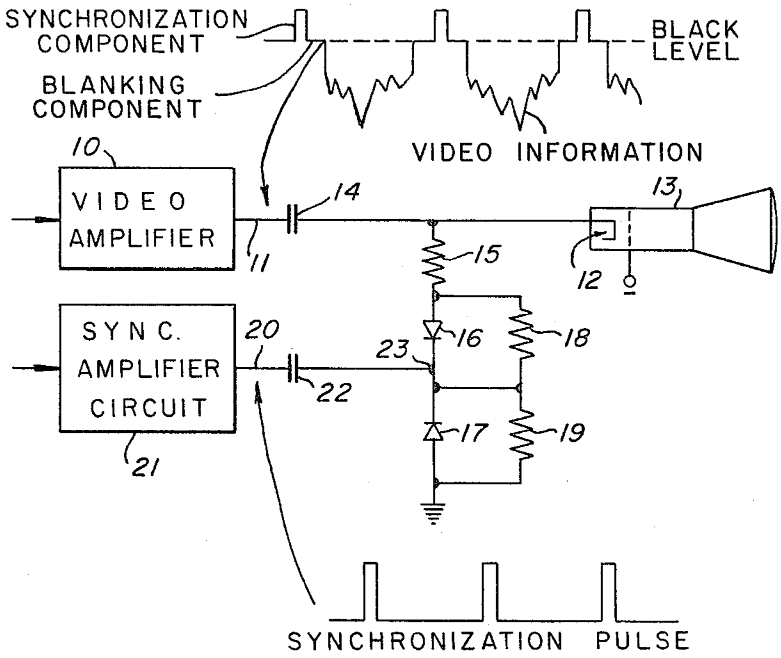

The invention is further described with references to the accompanying drawings in which:

FIGURE 1 is a schematic diagram of a D.-C. restoration circuit utilizing positive going video signals, and FIGURE 2 is a schematic diagram of a D.-C. restoration circuit utilizing negative going video signals.

Referring now to the drawings, a composite or non-composite video signal is connected from the output of a video amplifier 10 to an input connection 11 of the D.-C. restoration circuit. The signal is connected from the input connection 11 to the control electrode 12 of a cathode ray tube 13 by a coupling capacitor 14; the control electrode 12 being a grid in the circuit shown in FIGURE 1 and a cathode in the circuit shown in FIGURE 2. Serially connected from the junction of the control electrode 12 and the capacitor 14 to ground is a resistor 15, a first diode 16 and a second diode 17. The diodes 16 and 17 are connected in series opposition. A resistor 18 and a resistor 19 are connected in shunt with the first and the second diodes 16 and 17 respectively. An input connection 20 connects the output from a synchronization amplifier circuit 21 to the junction of the two diodes 16 and 17 through a coupling capacitor 22.

If the video signal being fed to the control electrode 12 of the cathode ray tube 13 is positive going, that is the blanking component and the synchronization component of the signal are negative going, the circuit as shown in FIGURE 1 is used. If the video signal is negative going, the circuit shown in FIGURE 2 is used. The synchronization pulses connected to the input connection 20 are of the same polarity but larger in amplitude than the synchronization component of the video signal.

In the circuit described in FIGURE 1, the positive going video signal is applied to the input connection 11. At the same time, the synchronization pulses are applied to the input connection 20. The blanking component of the video signal forward biases the first diode 16 and thereby commences to charge the capacitor 14 through the resistor 15 from the charge on the capacitor 22. Coincident with the arrival of the negative synchronization component of the video signal is the synchronization pulse at the input connection 20. Since the amplitude of the synchronization pulse is greater than the synchronization component of the video signal, both the first diode 16 and the second diode 17 are reversed biased when the synchronization pulse is present. The video signal is therefore, clamped to the blanking component of the video signal rather than to the tips of the synchronization component.

The junction of the two diodes, designated reference point 23, is maintained effectively at ground potential by the resistor 19, which bleeds off any negative charge apppearing at the reference point 23 and resulting from the forward conduction of the diodes 16 or 17 charging the capacitor 22. Resistor 15, connnected in series with the diode 16, limits the forward resistance of the diode 16. Although the resistor 15 degrades the clamping action of the D.-C. restoration circuit, it greatly improves the immunity of the circuit to noise. This is particularly beneficial when the television monitor or receiver is used for the reception of video signals which have been transmitted over a radio relay link. With resistor 15 present, the D.-C. restoration action takes longer and thereby ignores any very short term variations caused by noise spikes.

Any leak-through of the synchronization pulses from the reference point 23 to the control electrode 12 of the picture tube 13, drives the control electrode 12 further into the blacker than black region, and will, therefore, assist in the blanking operation.

Resistors 15, 18 and 19 provides a D.-C. return path for the control electrode 12 of the picture tube 13. The same resistors 15, 18 and 19 also provide a discharge path for the capacitor 14. In addition, the resistor 19 provides a discharge path for the capacitor 22. The time constant of the capacitor 14 and the resistors 15, 18 and 19 is in the order of 0.25 second for a standard video signal. The time constant of the capacitor 22 and the resistor 19 is in the order of 25 milliseconds.

Typical values for these components are as follows:

| | | |
|---|---|---|
| Capacitors 14 and 22 | microfarad | 0.1 |
| Resistor 15 | ohms | 2200 |
| Resistor 18 | megohms | 2.2 |
| Resistor 19 | ohms | 220,000 |

If the video signal applied to the input connection 10 is non-composite, the synchronization pulses will still be present at the input connection 20. Thus, the video signal will still be clamped at the blanking component level since the blanking component is longer than the synchronizing signal and the diode 16 will conduct before and after the presence of the synchronization pulse.

The circuit shown in FIGURE 2 functions in an identical manner to that shown in FIGURE 1. Here, however, the polarity of the video signal and the synchronizing signal is reversed. It is, therefore, necessary to reverse the polarity of the two diodes 16 and 17.

What I claim as my invention is:

1. A direct current restoration circuit for an image reproducing device, said circuit being adapted to receive a synchronization pulse and a video signal having a blanking component and a synchronization component superimposed on the blanking component, said synchronization pulse being coincident with said synchronization component, said circuit comprising input and output connections for connecting the video signal thereto and therefrom respectively, a first coupling capacitor serially connected between said input and output connections, a first and a second unidirectional device serially connected in reverse polarity across said output connections, means for coupling the synchronization pulse to the junction of the first and the second unidirectional devices through a second coupling capacitor so as to render said unidirectional devices non-conductive during the presence of said synchronization pulse, and resistive means for controlling the conduction of said unidirectional devices so as to clamp the blanking component of the video signal to a predetermined potential.

2. A direct current restoration circuit as claimed in claim 1 in which the first and the second unidirectional devices each have a cathode and an anode, the cathode of the first unidirectional device is connected to the junction of the first capacitor and the output connections, the anode of the second unidirectional device is connected to the anode of the first unidirectional device and both the synchronization pulse and the blanking component of the video signal are negative going voltages.

3. A direct current restoration circuit as claimed in claim 1 in which the first and the second unidirectional devices each have a cathode and an anode, the anode of the first unidirectional device is connected to the junction of the first capacitor and the output connections, the cathode of the second unidirectional device is connected to the cathode of the first unidirectional device, and both the synchronization pulse and the blanking component of the video signal are positive going voltages.

4. A direct current restoration circuit as claimed in claim 2 in which the resisitive means for controlling the conduction of said unidirectional devices comprises a first resistor and a second resistor connected in shunt with the first unidirectional device and the second unidirectional device respectively, and a third resistor is interposed the cathode of the first device and the junction of the first capacitor and the output connections.

5. A direct current restoration circuit as claimed in claim 3 in which the resistive means for controlling the conduction of said unidirectional devices comprises a first resistor and a second resistor connected in shunt with the first unidirectional device and the second unidirectional device respectively, and a third resistor is interposed the anode of the first device and the junction of the first capacitor and the output connections.

6. A direct current restoration circuit as defined in claim 4 in which the image reproducing device comprises a video amplifier for amplifying the video signal, said amplifier having output connections connected to the input connections of the direct current restoration circuit; and a synchronization amplifier circuit for amplifying the synchronization component of the video signal thereby producing the synchronization pulse, said amplifier circuit having output connections for connecting the synchronization pulse to the junction of the first and the second unidirectional devices through the second capacitor.

7. A direct current restoration circuit as defined in claim 5 in which the image reproducing device comprises a video amplifier for amplifying the video signal, said amplifier having output connections connected to the input connections of the direct current restoration circuit; and a synchronization amplifier circuit for amplifying the synchronization component of the video signal thereby producing the synchronization pulse, said amplifier circuit having output connections for connecting the synchronization pulse to the junction of the first and the second unidirectional devices through the second capacitor.

8. In a direct current restoration circuit for an image reproducing device for a video signal having a blanking component and a synchronization component superimposed on the blanking component, said direct current restoration circuit comprising video signal input and output connections, a first coupling capacitor serially connected between said input and output connections, a first and a second unidirectional device serially connected in reverse polarity across said output connections, means for coupling a synchronization pulse to the junction of the first and second unidirectional devices through a second coupling capacitor and resistive means for controlling the conduction of said unidirectional devices, the method of clamping the blanking component of the video signal to a predetermined potential comprising applying said video signal to said video signal input connections and applying said synchronization pulse to said junction in coincidence with said synchronization component so as to render said unidirectional devices non-conductive during the presence of said synchronization pulse.

References Cited by the Examiner

UNITED STATES PATENTS 2,934,602 4/1960 Cope 178—7.2

OTHER REFERENCES

Fink: "Television Engineering Handbook," McGraw-Hill, New York, 1957; pp. 11–41, through 11–45 and 16–117 through 16–122.

DAVID G. REDINBAUGH, *Primary Examiner.*

J. McHUGH, R. L. RICHARDSON, *Assistant Examiners.*